Jan. 2, 1934.  C. M. TICHENOR ET AL  1,941,961
AUTOMOBILE RADIO SET
Filed Feb. 23, 1933  4 Sheets-Sheet 1

Inventors
Carl M. Tichenor
Byron C. Booth

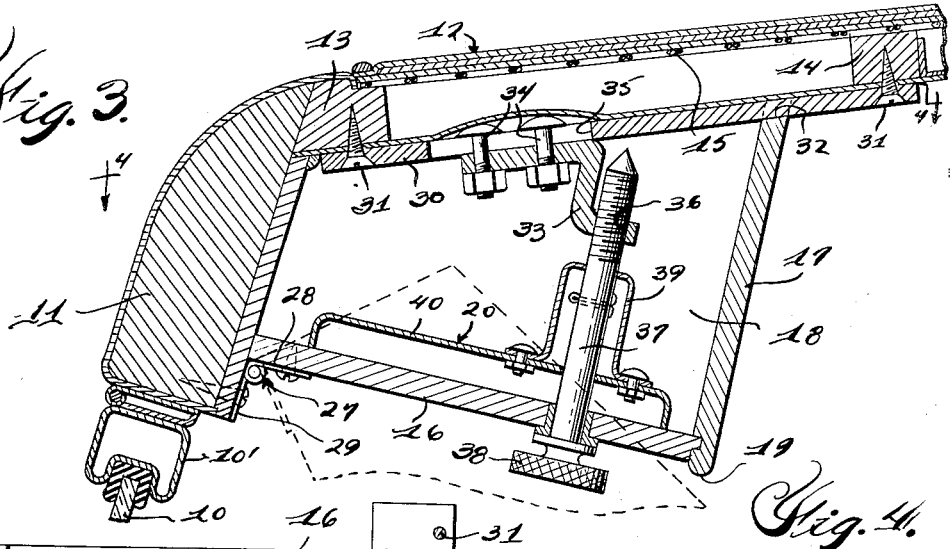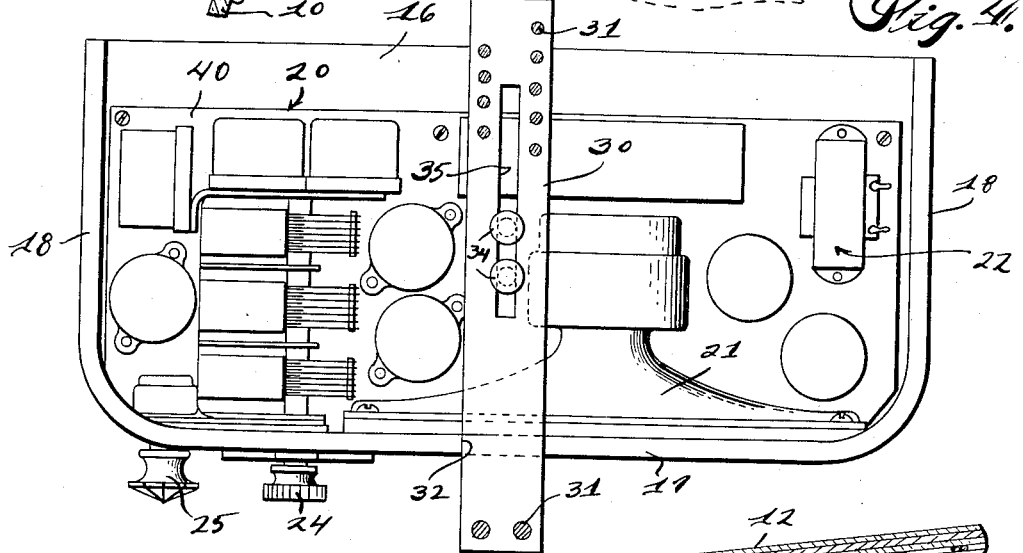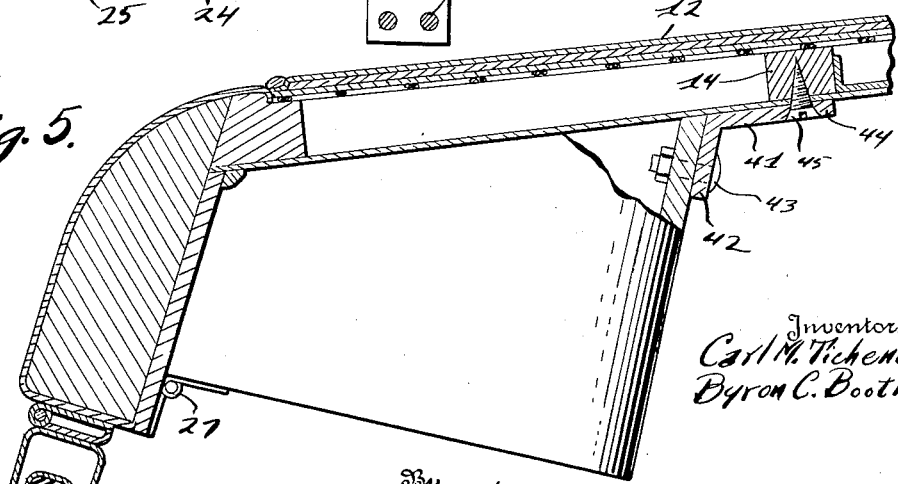

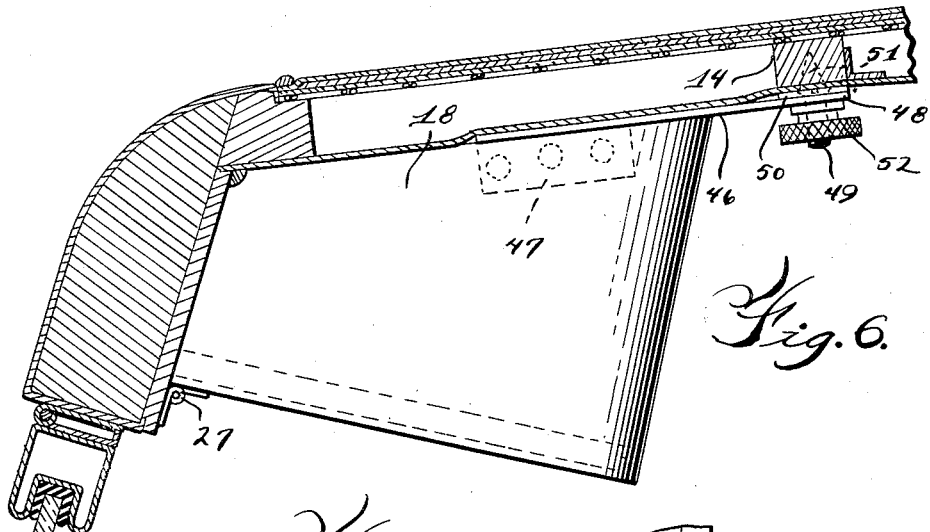
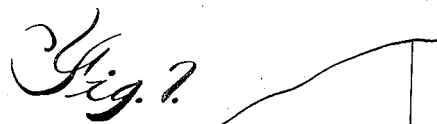
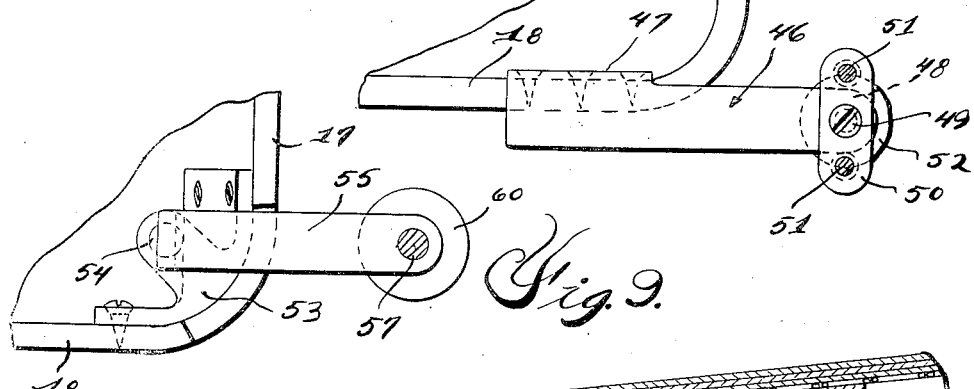
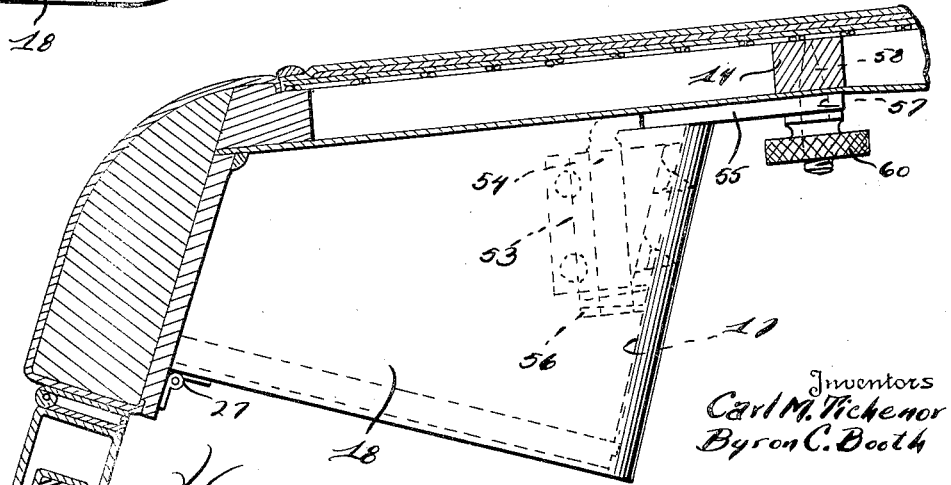

Jan. 2, 1934.  C. M. TICHENOR ET AL  1,941,961
AUTOMOBILE RADIO SET
Filed Feb. 23, 1933  4 Sheets-Sheet 4
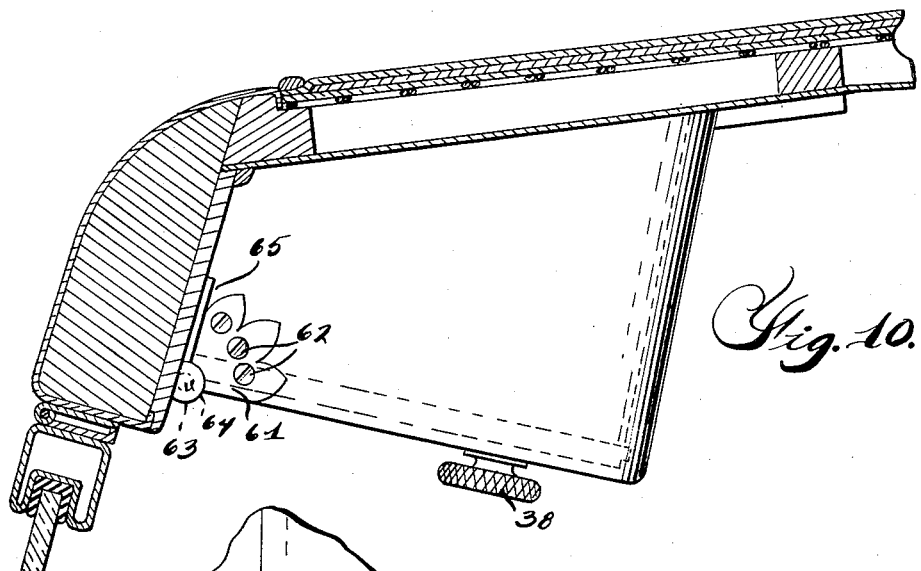
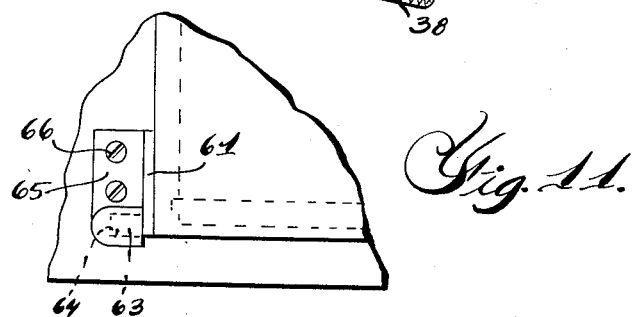
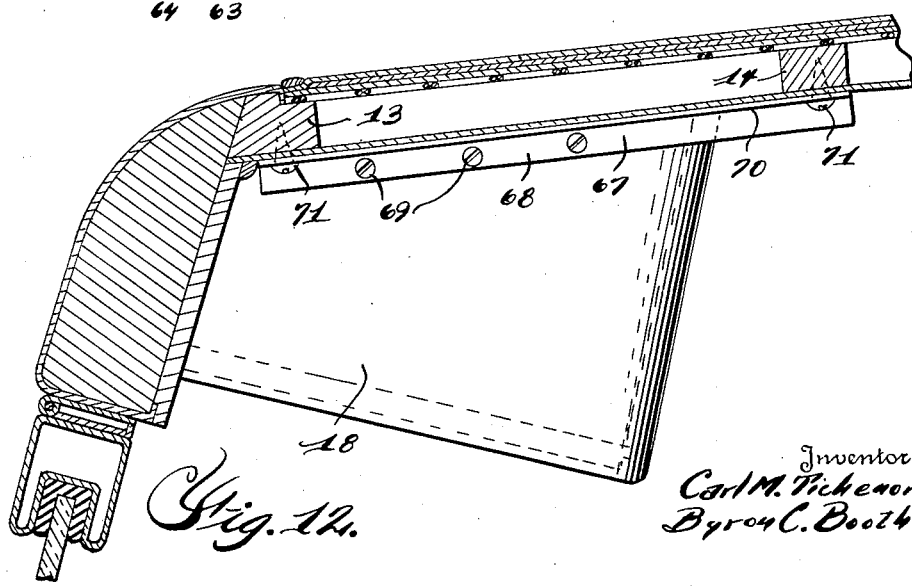
Inventors
Carl M. Tichenor
Byron C. Booth
By Whittemore Hulbert Whittemore Belknap
Attorneys Patented Jan. 2, 1934

1,941,961

UNITED STATES PATENT OFFICE 1,941,961

AUTOMOBILE RADIO SET

Carl M. Tichenor, Muskegon, and Byron C. Booth, Muskegon Heights, Mich.; said Booth assignor to said Tichenor Application February 23, 1933. Serial No. 658,178

21 Claims. (Cl. 250—14)

This invention relates to radio receiving sets and more especially to a complete radio receiving set designed and proportioned for installation in a motor vehicle body above the windshield thereof and at the juncture of the windshield header or front roof rail and the adjacent roof structure.

At the present time, it is quite generally the practice, in the commercial production of radio receiving sets adapted for installation in motor vehicles and the like, to construct the set for installation under the instrument board or panel of the vehicle. The majority of these commercially known types of apparatus, by reason of their construction and the manner of installation employed, necessitate the separation of the complete receiving set into several separate and distinct units, and also generally require the use of remote control apparatus.

For instance, in the majority of the known types of automobile radio receiving sets the radio chassis comprises one unit; the "B" batteries or "B" battery eliminator comprises another unit; and the loud speaker is formed as a third separate unit. Such arrangements also usually require the use of remote control means for controlling the set together with the necessary cable connections between the several units.

There are many obvious objections to automobile receiving sets of this general character. For instance, if one or more of the units are installed under the instrument board they interfere with the leg room of the passenger of the front seat and are thus objectionable. If the radio chassis is installed at this point, it is, as a consequence, in close proximity to the cowl openings usually provided in motor vehicle bodies and thus presents the possibility of the entrance of rain, foreign matter, and the like into the set. If the speaker is installed below the instrument panel, the sounds reproduced thereby are muffled by reason of the proximity of the front seat or of the passenger, or both. The use of a remote control device for the set not only constitutes an item of expense, but is at best only partially satisfactory and accurate due to the inevitable backlash in devices of this character. In addition, the cost of installation becomes an important item and the matter of the distribution of the several units a serious problem.

It is, therefore, one of the important objects of our invention to provide a complete radio receiving set including a radio chassis, a "B" battery eliminator and a speaker, all incorporated as a unit in one cabinet which cabinet is designed and proportioned for installation in the space above the windshield at the juncture of the windshield header or front roof rail and the adjacent roof structure.

It will be immediately apparent that in accordance with our invention all of the heretofore mentioned objections now experienced with known commercial types of automobile radios are eliminated. The receiving set as a complete unit may be quickly and easily installed and operatively connected by means of three wires, one to the motor vehicle battery, one to a ground and one to the aerial. The use of remote control means for adjusting the radio is eliminated because the location of the set above the windshield enables the control knobs to be directly reached and operated. The position of the speaker which is incorporated as a part of the complete unit is acoustically correct and moreover the set, when arranged in this position, does not interfere with the comfort of the passengers, nor is it exposed to rain, foreign matter, and the like.

The present invention has as another of its important objects to provide a radio receiving set and mounting means therefor so arranged that convenient access to the interior thereof may be had to enable the quick replacement of tubes, minor repairs, etc. This object is accomplished by hinging or otherwise swingingly mounting the cabinet of the set so that, when desired, it may be swung down away from the roof of the vehicle to expose the inside of the cabinet.

Other objects of the invention are to simplify, render more efficient, render more attractive, and improve generally devices of this character, all of the aforementioned objects and advantages of the invention being made more apparent as this description proceeds, especially when considered with the accompanying drawings wherein:

Figure 3 is an enlarged sectional view taken transversely of the radio set and showing the adjacent portions of the motor vehicle also in section;

Figure 4 is a view partly in section and partly in top plan taken substantially on the plane indicated by line 4—4 in Figure 3;

Figure 5 is a sectional elevational view of the radio set, with the adjacent parts of the automobile body in section, showing a modified form of mounting means;

Figure 6 is a view similar to Figure 5 showing still another modified form of mounting means;

Figure 7 is a detail sectional elevational view taken substantially on the plane indicated by line 7—7 in Figure 6;

Figure 8 is a view similar to Figure 5 showing still another modified form of construction;

Figure 9 is a detail sectional elevational view taken substantially on the plane indicated by line 9—9 in Figure 8;

Figure 10 is a view similar to Figure 5 showing still another modified form of mounting means;

Figure 11 is a detail view of the mounting means shown in Figure 10 and taken at right angles thereto, and Figure 12 is a view similar to Figure 5 showing still another modified form of mounting means.

Figure 1:
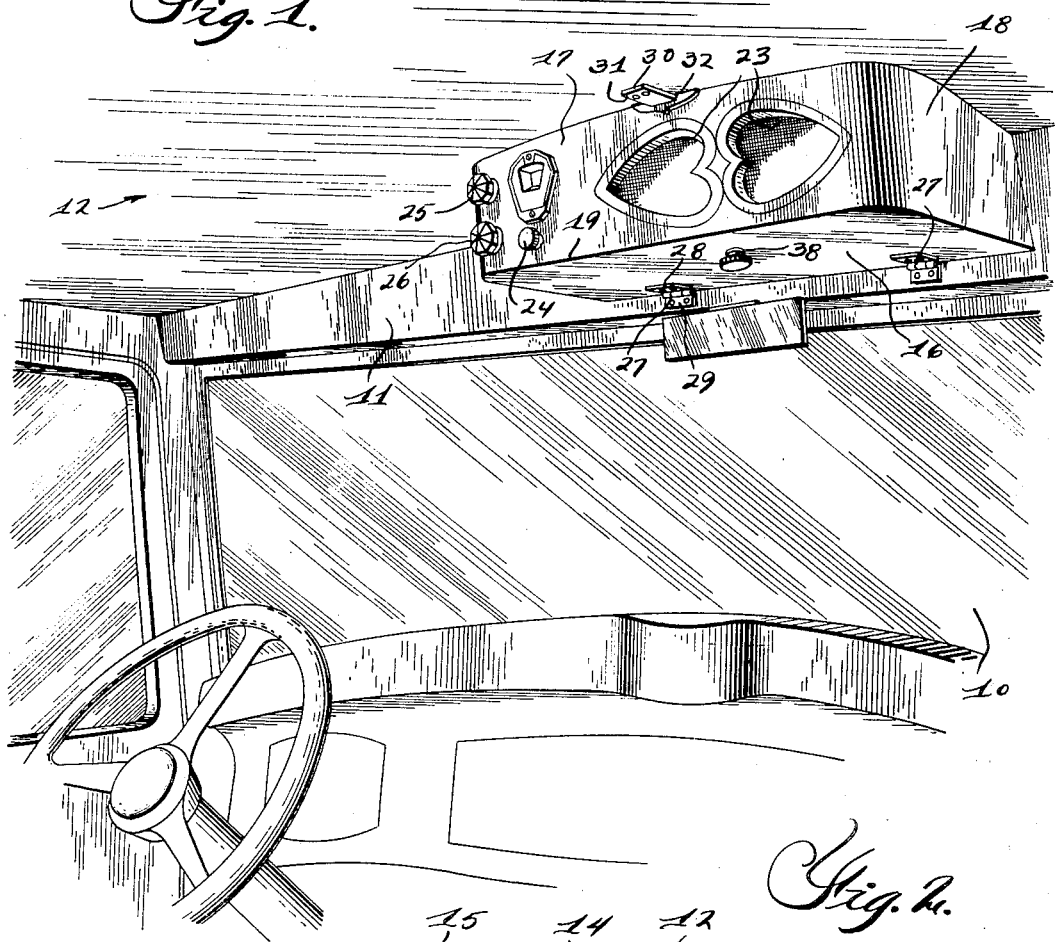
Figure 1 is a fragmentary perspective view of a motor vehicle with our improved radio receiving set associated therewith.
Figure 2:
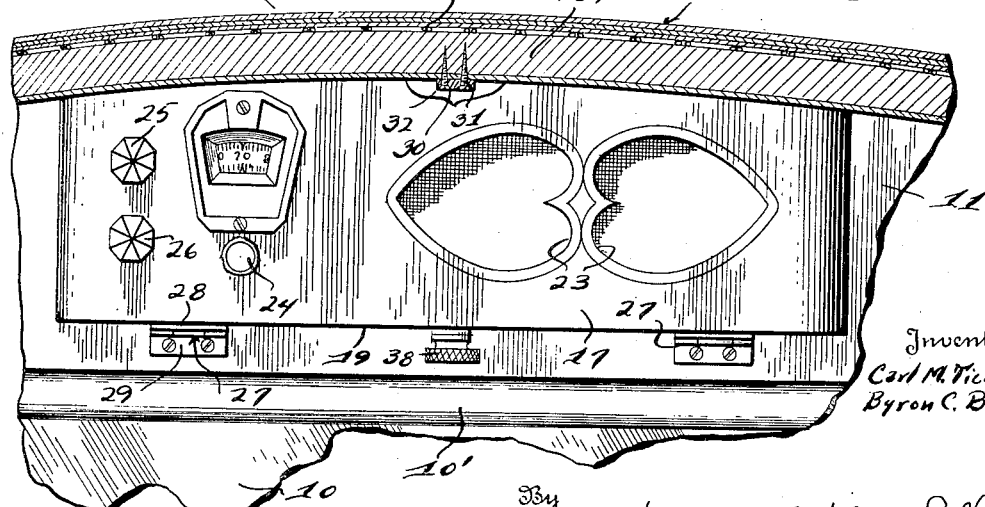
Figure 2 is a transverse vertical sectional view through the top portion of the motor vehicle looking forward.

Referring now more particularly to the drawings, and more especially to Figures 1 to 4 thereof, it will be noted that there is illustrated, fragmentarily, a motor vehicle body of the conventional or accepted type including a windshield 10, a front roof rail or windshield header bar 11, and a top or roof structure 12. The front roof rail or windshield header is, as customary, located above the windshield and closes the space between the upper horizontal edge of the windshield and the roof structure 12.

It is generally the custom, in present day motor vehicle body construction, to incline the windshield and consequently the front roof rail rearwardly and to build the roof with an upward and rearward incline at the forward portion thereof and, as illustrated probably most clearly in Figure 3, this general type of design has been shown.

It is also the generally accepted practice to provide the roof with one or more transversely extending ribs, supports, or braces, one, indicated by the reference character 13, being usually arranged at the juncture of the roof and the front roof rail, and another, indicated by the reference character 14, being usually located spaced a short distance rearwardly therefrom. Of course, the other details of the body structure may, and do, vary considerably although the arrangement of cross ribs just described is practically universally adhered to. It is also quite generally the practice to incorporate in the roof structure a re-enforcement in the form of wire mesh or wire screen 15, and accordingly the same has been shown in Figure 3.

As has been pointed out hereinbefore, it is one of the primary objects of this invention to utilize the space above the windshield and at the juncture of the front roof rail and adjacent roof structure to mount our complete radio receiving set. Accordingly, a complete receiving set including the radio chassis, a "B" battery eliminator, and a speaker are arranged compactly in a cabinet which is designed and proportioned for installation in the corner or space above the windshield which is defined on two sides by the front roof rail 11 and adjacent roof structure 12 respectively. It is obvious that the length of this cabinet may, within certain limits, be varied as desired. In cross section, however, the cabinet is preferably flared from the front side to the rear side thereof to fit within and utilize to the greatest extent possible the obtuse angle formed at the juncture of the front roof rail and roof structure.

In constructing our cabinet, the same is provided with a bottom wall 16, a rear wall or panel 17 and end walls 18. When secured in position in the vehicle body, the front roof rail 11 constitutes the front wall of the cabinet and the adjacent roof structure 12 constitutes the top wall thereof. The rear wall or panel 17 is generally arranged so as to be parallel to the obliquely arranged roof rail 11, and the bottom wall 16 is arranged at a substantial right angle to both of these elements. By constructing the cabinet in this manner, it is believed that the maximum inside space possible is obtained with the minimum outside dimensions.

It is to be noted that the edge 19 formed by the juncture of the walls or panels 16 and 17 is kept at least in line with, if not above, the upper limit of the line of vision of the driver which is normally defined by the top 10' of the windshield frame. Thus the location of the radio set at this point does not interfere with the vision of the driver in any manner whatsoever.

It will be obvious that the details of the radio receiving set may be varied as found desirable or expedient, but in accordance with this invention it is preferable that a complete unit be incorporated within the cabinet, this complete unit including a radio chassis, indicated generally by the reference character 20, a loud speaker, indicated generally by the reference character 21, and a "B" battery eliminator, indicated generally by the reference character 22.

The loud speaker 21 may be of the magnetic or non-magnetic type, although the former is illustrated. The speaker faces rearwardly and is mounted in registration with openings 23 formed in the rear panel 17. Also mounted on this panel are such control knobs as the tuning knob 24, the tone control knob 25, and the volume control knob 26. These knobs are preferably, although not necessarily, located at the left hand side of the panel 17, as viewed from the driver's seat, so as to render the same easily accessible to the driver.

It will be understood that no effort has been made herein to indicate in detail all of the elements of the radio chassis; the "B" battery eliminator, or the speaker, because, as heretofore mentioned, the details of this apparatus form no important part of this invention.

However, with an arrangement of this character which includes a radio chassis, a "B" battery eliminator and a speaker, the set may be operatively connected merely by means of three wires, one being attached to the usual automobile battery, one being connected to a ground on the vehicle frame, and one an aerial wire, being connected to, for instance, the wire screen 15 usually provided in the roof structure.

The cabinet, when mounted on the vehicle, is arranged in the manner illustrated probably most clearly shown in Figure 3 in which all the parts of the complete radio unit are completely enclosed by the cabinet walls and the adjacent portions of the front roof rail 11 and roof structure 12. However, in accordance with this invention, the mounting means is so arranged that the cabinet may be swung downwardly away from the adjacent roof structure so that access may be had to the interior of the cabinet, thus making it possible to readily replace tubes, make minor repairs, etc.

To this end, the cabinet may be mounted in any one of various ways, several of which have been illustrated herein.

In Figures 1 to 4 inclusive, the cabinet is pivotally or hingedly mounted on the front roof rail 11 by means of hinges 27, the companion parts 28 and 29 of which are secured respectively to the bottom wall 16 of the cabinet and front roof rail 11. Thus it will be seen that the cabinet can be swung downwardly, when desired, to the position illustrated by dotted lines in Figure 3. For securing the cabinet in its normal position in engagement with the roof structure, we may provide a supporting bar 30, the ends of which are secured respectively to the cross ribs 13 and 14 by means of fastenings 31. The rear wall 17 of the cabinet (the front panel of the radio set) may be recessed as at 32 to accommodate this supporting bar. Secured to the supporting bar is an adjustable bracket 33, the bracket being secured to the bar by means of bolts 34 located in a slot 35 in the supporting bar. This bracket is provided with a threaded aperture 36 with which a thumb screw 37 is adapted to engage. This thumb screw extends through the bottom 16 of the cabinet and is provided with a head 38 so that it may be rotated from the outside of the cabinet. In the construction shown, a thumb screw centering bracket 39 is attached to the base or supporting plate 40 of the radio chassis. Thus with this construction when the thumb nut is disengaged from the bracket 33, the cabinet may be swung by means of its hinges 27 to the position shown in dotted lines in Figure 3 whereby the interior of the cabinet is rendered accessible for the reasons hereinbefore pointed out.

In Figure 5, a slightly modified form of mounting means is illustrated in which the hinges 27, previously referred to, are employed and in which the cabinet is held up against the roof structure 12 by means of a bracket 41 having one portion 42 thereof bolted or otherwise secured to the panel 17 by means of fastening elements 43, and the other portion 44 of the bracket secured by fastening means 45 of the cross rib 14.

In the form of construction shown in Figures 6 and 7 any type of hinge 27 may be employed, and the cabinet is secured to the roof structure by means of brackets 46 arranged at its ends of the cabinet. Each of these brackets is provided with an angular flange 47 secured to an end wall 18 of the cabinet and with an apertured end 48 adapted to engage over a stud 49 carried by a plate 50 which is secured by fastening means 51 to the cross rib 14. A thumb nut 52 engages the threaded end of the stud 49 to hold the bracket 46 and consequently the cabinet in engagement with the roof structure.

It will be obvious that in the forms of mounting means illustrated in Figures 5, and 6, and 7, the length of the brackets employed may be varied so as to bring the free ends thereof in registration with the cross rib 14.

In Figures 8 and 9 still another form of mounting means is employed which, as in the previously described forms of construction, may utilize hinges 27 of any preferred or desired type. In this form of construction a bracket in the form of a casting or the like 53 is secured to the inner wall of the cabinet at each end thereof at the juncture of the panels 17 with the end walls 18. Each of these brackets is provided with a bore to receive the portion 54 of a swinging arm 55. A collar 56 may be provided on the end of the arm portion 54 to hold the same in the bracket 53. The other end of the arm 55 is provided with an aperture 57 adapted to engage over a stud which has one end 58 formed with wood screw threads for engagement with the cross rib 14 and the other end 59 formed with machine screw threads for engagement by a knurled nut 60. The arms 55 may be swung so as to adjust the same to accommodate the location of the rib 14.

In Figures 10 and 11 still another form of mounting means is illustrated. In this form of construction the cabinet is preferably held up into engagement with the roof structure by means of the thumb screw having the head 38 such as described in the form of construction illustrated in Figures 1 to 4. However, in this form of construction the hinges are somewhat different, being designed for use principally where the front roof rail is relatively narrow. In this form of construction, there is provided on each end panel 18 of the cabinet, a plate 61 secured thereto by fastening means 62 and provided with a stud 63 projecting therefrom. This stud is received in a socket 64 carried by a plate 65 secured by fastening means or the like 66 to the front roof rail 11.

Where it appears unnecessary or inexpedient to hingedly mount the cabinet, the construction illustrated in Figure 12 may be employed. In this form of construction, angle iron supporting bars 67 are utilized, one at each end of the cabinet. Thus one flange 68 of each of these supporting bars may be secured as for instance by means of fastening elements 69 to the adjacent end wall 18 of the cabinet, whereas the other flange 70 of each supporting bar may be secured at its ends to the cross ribs 13 and 14 respectively by means of fastening elements 71.

From the foregoing, it will be apparent that various and sundry methods may be employed for mounting the cabinet in the motor vehicle body. As will be seen, it is preferable, although not necessary, to so construct and arrange the mounting means that the cabinet may be swung downwardly away from the roof structure so as to expose the interior of the cabinet to provide for the replacement of tubes, minor repairs, and the like.

However, in all of the forms of construction, the space above the windshield is utilized for mounting the complete radio set and all of the advantages of such an arrangement are accordingly attained. As has been pointed out, this position of the radio receiving set is acoustically correct because the loud speaker faces the rear of the vehicle body and is located above the front seat and also substantially above the heads of the passengers of the front seat so that the sounds emanating therefrom are not muffled or otherwise distorted. Moreover, the receiving set does not interfere with the movement of the passengers and is completely protected from rain and other foreign elements. This arrangement facilitates installation and renders the same less expensive. Furthermore, this location of the radio receiving set renders the tuning knobs easily accessible to the driver and eliminates the use of a remote control means which is not only expensive but relatively inefficient.

Various other modifications of this invention may suggest themselves to those skilled in this art, and to this end reservation is made to make such changes, modifications and rearrangements as may come within the purview of the accompanying claims.

What we claim as our invention is:

1. The combination with a motor vehicle, of a radio receiving set mounted in said vehicle between the upper edge of the windshield and the adjacent roof structure thereof.

2. The combination with a motor vehicle, of a radio receiving set mounted above and adjacent the windshield and below the roof of said vehicle.

3. The combination with a motor vehicle having a windshield and an angularly extending roof structure spaced therefrom, of a radio receiving set, and means for mounting said radio receiving set inside the motor vehicle in the space between said windshield and roof structure.

4. The combination with a front roof rail and adjacent roof structure of a motor vehicle, of a radio receiving set, and means for mounting said receiving set in the space defined on two sides by said roof rail and roof structure.

5. The combination with a motor vehicle front roof rail and adjacent roof structure, of a complete radio receiving set including a cabinet, and means for mounting said cabinet in the corner defined by said roof rail and roof structure.

6. In an automobile radio, a cabinet containing a complete radio receiving set including a radio chassis, speaker and "B" battery eliminator, said cabinet being designed and proportioned for attachment to a motor vehicle in the space between the top of the windshield and the lower surface of the roof thereof.

7. The combination with a motor vehicle provided with a front roof rail and a roof structure extending rearwardly therefrom, of a radio set including a cabinet and means for securing the front face of said cabinet adjacent said roof rail and the top face thereof against said roof structure.

8. The combination with a front roof rail and adjacent roof structure of a motor vehicle which at their juncture form a substantially obtuse angle, of a radio receiving set including a cabinet of flaring cross section, and means for securing said cabinet in the obtuse angle at the juncture of said roof rail and roof structure.

9. The combination with the front roof rail and the adjacent roof structure of a motor vehicle, of a radio receiving set including a cabinet open at its top and front sides, and means for mounting said cabinet in the corner defined by the juncture of said roof rail and roof structure whereby the said parts of the motor vehicle form closures for the open sides of said cabinet.

10. The combination with a motor vehicle having a windshield, a front roof rail arranged thereabove, and a roof structure extending rearwardly from said roof rail, of a complete radio receiving set including a cabinet, and means for mounting said radio receiving set above said windshield including means for securing said cabinet to said roof rail and roof structure respectively.

11. The combination with a motor vehicle, of a radio receiving set mounted above and adjacent to the windshield and below the roof of the motor vehicle and including a loud speaker facing toward the rear.

12. The combination with a motor vehicle having a windshield and a roof structure spaced therefrom, of a radio receiving set and means for mounting said radio receiving set in the space between said windshield and roof structure and for providing for movement of said set with respect to said body parts, for the purpose set forth.

13. The combination with a motor vehicle provided with a front roof rail and a roof structure extending rearwardly therefrom, of a radio receiving set including a cabinet having an opening therein adjacent the roof structure, and means for hingedly mounting said cabinet on said roof rail and securing the same to said roof structure whereby said cabinet may be moved away from said roof structure to permit access to the interior thereof through said opening.

14. The combination with a motor vehicle provided with a front roof rail and a roof structure joined thereto and provided with a re-enforcing element spaced from said roof rail, of a radio receiving set including a cabinet, means for hingedly connecting said cabinet to said roof rail, and means for detachably connecting said cabinet to said roof re-enforcing element, for the purpose set forth.

15. The combination with a motor vehicle provided with a front roof rail and a roof structure joined thereto and provided with a re-enforcing element spaced from said roof rail, of a radio receiving set including a cabinet, means for hingedly connecting said cabinet to said roof rail, and readily detachable means for connecting said cabinet to said roof re-enforcing element.

16. The combination with a motor vehicle provided with a front roof rail and a roof structure joined thereto and provided with a re-enforcing element spaced from said roof rail, of a radio receiving set including a cabinet, means for hingedly connecting said cabinet to said roof rail, and means adjustable with respect to said cabinet for connecting said cabinet to said roof re-enforcing element.

17. The combination with a motor vehicle provided with a front roof rail and an adjacent roof structure, of a radio receiving set including a cabinet open at its top side, and means for mounting said cabinet in the corner defined by said roof rail and roof structure whereby said open top is normally closed by said roof structure, said means including hinge members for securing said cabinet to said front roof rail and means for detachably connecting said cabinet to said roof structure, for the purpose set forth.

18. The combination with a front roof rail and the adjacent roof structure of a motor vehicle, of a radio receiving set including a cabinet open at its top side, hinges connecting the lower forward edge of said cabinet to said roof rail so that said cabinet may be swung downwardly away from said roof to expose the open top side of said cabinet, and readily detachable means for securing said cabinet to said roof structure.

19. The combination with a front roof rail and adjacent roof structure of a motor vehicle, of a radio receiving set including tuning means therefor, and means for mounting said radio receiving set in the space defined on two sides by said roof rail and roof structure.

20. The combination with a motor vehicle, of a radio receiving set including tuning means therefor and a loud speaker, and means for mounting said radio receiving set in said vehicle between the upper edge of the windshield and the adjacent roof structure of the vehicle.

21. The combination with a motor vehicle having a windshield, a front roof rail thereabove, and adjacent roof structure extending angularly with respect thereto, of a radio receiving set including tuning means for the receiving set and a loud speaker, and means for mounting said radio receiving set at the juncture of said roof rail and adjacent roof structure.

CARL M. TICHENOR.
BYRON C. BOOTH.